United States Patent
Zhang et al.

(10) Patent No.: US 11,144,953 B1
(45) Date of Patent: Oct. 12, 2021

(54) DETERMINING PERFORMANCE METRICS FOR DELIVERY OF ELECTRONIC MEDIA CONTENT ITEMS BY ONLINE PUBLISHERS SCALED USING A BASELINE CONVERSION RATE

(71) Applicant: Facebook, Inc., Menlo Park, CA (US)

(72) Inventors: Jie Zhang, Seattle, WA (US); Pu Zhang, Seattle, WA (US); Ying Jiang, Seattle, WA (US); Sergiy Dubynskiy, Kenmore, WA (US); Goran Predovic, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 227 days.

(21) Appl. No.: 15/956,462

(22) Filed: Apr. 18, 2018

(51) Int. Cl.
  *G06Q 30/02* (2012.01)
  *H04L 29/08* (2006.01)
  *G06N 20/00* (2019.01)
  *G06Q 50/00* (2012.01)

(52) U.S. Cl.
  CPC ......... *G06Q 30/0246* (2013.01); *G06N 20/00* (2019.01); *H04L 67/025* (2013.01); *H04L 67/22* (2013.01); *G06Q 50/01* (2013.01)

(58) Field of Classification Search
  CPC .......... G06Q 30/0243; G06Q 30/0246; G06Q 50/01; H04L 67/025; H04L 67/22
  See application file for complete search history.

(56) References Cited

U.S. PATENT DOCUMENTS

| | | | | |
|---|---|---|---|---|
| 6,484,182 B1 * | 11/2002 | Dunphy | ................. | G06Q 10/06 707/999.102 |
| 6,961,858 B2 * | 11/2005 | Fransdonk | ............. | G06F 21/10 380/281 |
| 7,020,635 B2 * | 3/2006 | Hamilton | ............... | G06Q 20/00 705/51 |
| 7,080,049 B2 * | 7/2006 | Truitt | .................... | G06Q 20/16 380/30 |

(Continued)

OTHER PUBLICATIONS

Ma, Q. (2016). Modeling users for online advertising (Order No. 10508136). Available from ProQuest Dissertations and Theses Professional. (1878886406). Retrieved on Aug. 28, 2021 from URL: <https://dialog.proquest.com/professional/docview/1878886406?accountid=131444>. (Year: 2016).*

*Primary Examiner* — Abhishek Vyas
*Assistant Examiner* — Monica A Mandel
(74) *Attorney, Agent, or Firm* — Fenwick & West LLP

(57) ABSTRACT

A user action associated with a content item performed by a target user is detected. Information describing online publishers that delivered the content item to the target user is retrieved. For each publisher, a likelihood that the user action would have occurred without the publisher's delivery of the content item to the target user is determined. An estimated increase in the likelihood that the user action occurred due to the publisher's delivery of the content item to the target user is determined. A baseline value indicating a likelihood that the user action would have occurred without delivery of the content item to the target user by any publishers is estimated based on attributes for the target user.

(Continued)

A performance metric is determined for each publisher, wherein ratios of the metrics are scaled based on the baseline value and are related based on corresponding ratios of the estimated increases in likelihoods.

18 Claims, 5 Drawing Sheets

(56) References Cited

U.S. PATENT DOCUMENTS

| | | | | |
|---|---|---|---|---|
| 7,090,128 B2* | 8/2006 | Farley | ............... | H04L 67/2823 235/384 |
| 7,107,462 B2* | 9/2006 | Fransdonk | ............ | G06Q 20/12 380/282 |
| 7,150,045 B2* | 12/2006 | Koelle | ............... | G06F 21/552 726/26 |
| 7,395,244 B1* | 7/2008 | Kingsford | ............. | G06Q 10/06 705/52 |
| 7,523,071 B2* | 4/2009 | Fox | ............... | G06Q 30/06 705/52 |
| 7,587,502 B2* | 9/2009 | Crawford | ............... | A63F 13/12 709/229 |
| 7,620,606 B2* | 11/2009 | Gentry | ............... | G06Q 20/02 380/277 |
| 7,711,586 B2* | 5/2010 | Aggarwal | ............. | G06Q 10/02 705/5 |
| 9,183,562 B2* | 11/2015 | Chittilappilly | ......... | G06Q 30/02 |
| 2010/0138291 A1* | 6/2010 | Silverman | ............. | G06Q 30/02 705/14.45 |
| 2014/0324567 A1* | 10/2014 | Saldanha | ........... | G06Q 30/0242 705/14.41 |
| 2015/0154631 A1* | 6/2015 | Umeda | ............. | G06Q 30/0243 705/14.42 |

* cited by examiner

DETERMINING PERFORMANCE METRICS FOR DELIVERY OF ELECTRONIC MEDIA CONTENT ITEMS BY ONLINE PUBLISHERS SCALED USING A BASELINE CONVERSION RATE

BACKGROUND

This disclosure relates generally to delivery of electronic media content items, and in particular to determining performance metrics for online publishers delivering the content items.

Content providers and social networking systems often present content items to users via websites of online publishers. Such content items are viewed by users on user devices, for example, a laptop or a mobile device. Users typically interact with content items by clicking on them, sharing them with their social networking connections, making financial transactions, etc., on a user device.

Conventional techniques for determining performance metrics for online publishers, such as which publisher influenced a user action associated with a content item delivered by a subset of publishers sometimes provide inaccurate or poor results. Some conventional techniques attempt to allocate credit for performance only to the last publisher in a sequence of publishers that delivered the content item, resulting in imprecise performance metric determination because the techniques do not account for which online publishers really influenced the user action, if any.

SUMMARY

An online system stores information describing deliveries of content items and user actions associated with the delivered content items. Each delivery is performed by one of a plurality of online publishers to one of a plurality of users of the online system. A user action associated with a content item performed by a target user of the plurality of users is detected. From the stored information, information describing a set of the plurality of online publishers that delivered the content item to the target user is retrieved. For each online publisher of the set of the plurality of online publishers, a likelihood is determined that the user action would have occurred without the online publisher's delivery of the content item to the target user. An estimated increase in the likelihood that the user action occurred due to the online publisher's delivery of the content item to the target user based on the determined likelihood that the user action would have occurred without the online publisher's delivery of the content item to the target user is determined. A set of attributes maintained in the online system for the target user is then retrieved. Based at least in part on the set of attributes for the target user, a baseline value indicating a likelihood that the user action would have occurred without delivery of the content item to the target user by any of the set of the plurality of online publishers is estimated. A performance metric is determined for the online publisher, wherein ratios of performance metrics for the set of the plurality of online publishers are scaled based at least in part on the baseline value and are related based on corresponding ratios of estimated increases in likelihoods that the user action occurred due to deliveries of the content item by the set of the plurality of online publishers. The performance metrics for the set of the plurality of online publishers for the user action may be transmitted within the online system, to a content provider, to an online publisher, or to a third party entity.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Example System Environment

Figure 1:
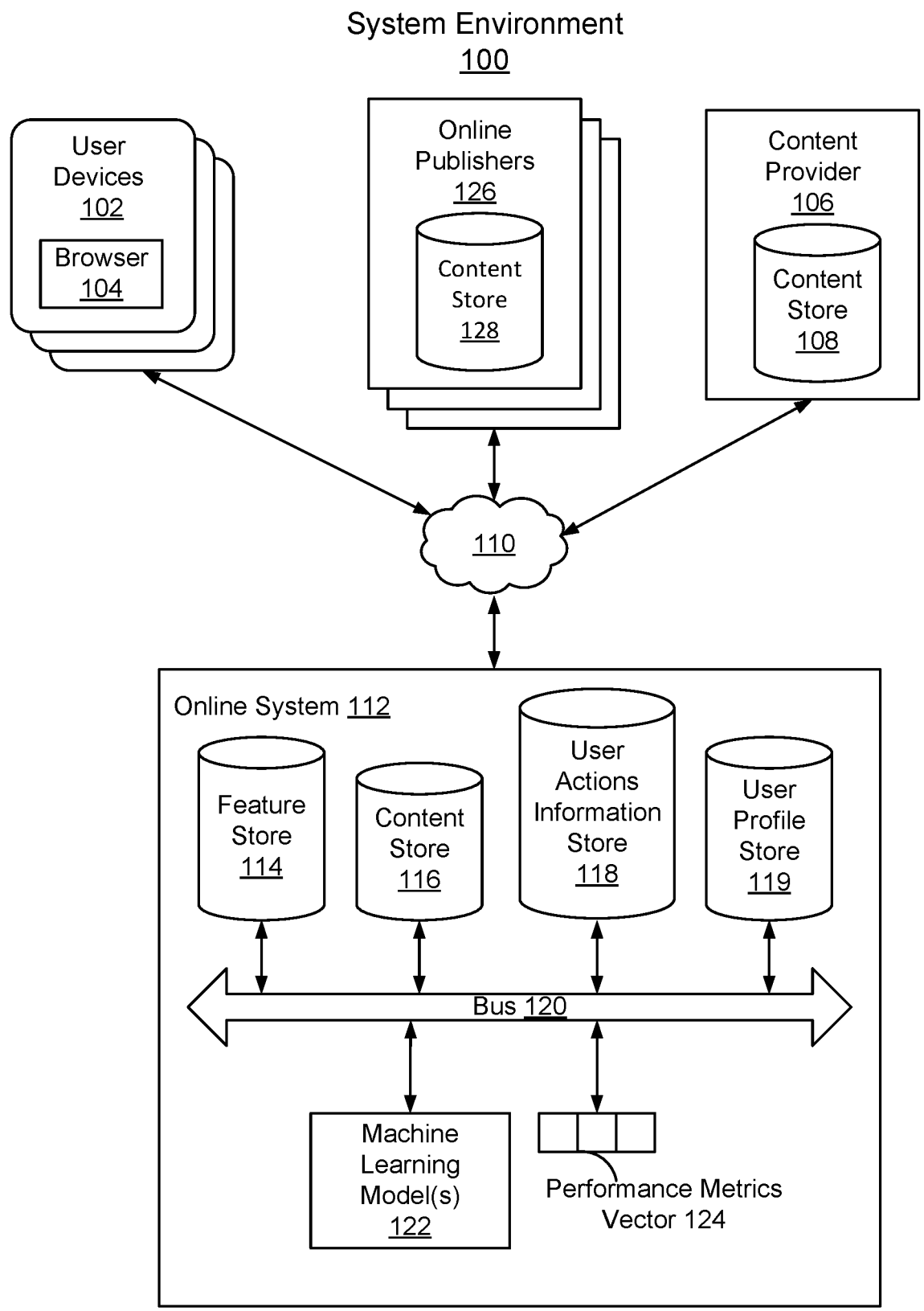
FIG. 1 is a block diagram of an example system environment in which an online system operates, in accordance with an embodiment.

FIG. 1 is a block diagram of an example system environment 100 in which an online system 112 operates, in accordance with an embodiment. The system environment 100 shown in FIG. 1 includes a content provider 106, online publishers 126, user devices 102, a network 110, and the online system 112. The term "content item" refers to "electronic media content item" herein.

The online system 112 receives content items from the content provider 106 for distribution by the online system 112 and the online publishers 126. The content provider 106 may be a provider of sponsored content such as a political campaign, a university, a corporation, the government, etc. Sponsored content includes content items for which the content provider 106 provides remuneration to the online system 112 for targeting and distribution of the content items to the user devices 102 of an online audience. Content items may be images, text paragraphs, video clips, audio clips, hyperlinks, online forms, etc. Examples of sponsored content include online advertisements. The content provider 106 may include a content store 108 for storing content items. The content store 108 may be organized as a database, table, file, etc., stored on one or more of removable or non-removable memory cards and computer hard drives.

The online publishers 126 publish content on the Internet, create and upload websites, update webpages, and transmit text, images, videos, and other types of media to the user devices 102. In embodiments, ($P_1$, $P_2$, . . . , $P_N$) represents the identities of the N online publishers 126. A content item may be delivered to user devices 102 by a set (e.g., $P_1$, $P_5$, and $P_7$) of the N online publishers 126. In embodiments, the content provider 106 may transmit content items from the content store 108 to the online publishers 126 directly via the network 110. The online publishers 126 then embed the content items on webpages maintained by the online publishers 126 and delivered to user devices 102. In embodiments, the content provider 106 may transmit content items from the content store 108 to the online system 112 via the network 110. The online system 112 may transmit the content items from the content store 116 to the online publishers 126 via the network 110. The online publishers 126 then embed the content items on webpages maintained by the online publishers 126 and delivered to user devices 102. Each online publisher may include a content store 128 for storing content items. The content store 128 may be organized as a database, table, file, etc., stored on one or more of removable or non-removable memory cards and computer hard drives.

The online system 112 or online publishers 126 present content items to the user devices 102. A user device 102 is used for interacting with the online system 112 or with third-party websites such as the online publishers 126 using the browser 104. The user device 102 is a computing device capable of receiving user input as well as transmitting and/or receiving data via the network 110. In one embodiment, the user device 102 is a conventional computer system, such as a desktop or laptop computer. Alternatively, the user device 102 may be a device having computer functionality, such as a personal digital assistant (PDA), a tablet, a mobile telephone, a smartphone or another suitable device.

In embodiments, the user device 102 executes an application allowing a user to interact with the online system 112. The user device 102 may execute an application, for example, the browser 104, to enable action between the user device 102 and the online system 112 or online publishers 126 via the network 120. In embodiments, the user device 102 interacts with online publishers 126 through an application programming interface (API) running on a native operating system of the user device 102, such as IOS® or ANDROID™. A user may download content items from the online system 112 or websites of online publishers 126 to the user device 102 using browser 104 and interact with the content items by clicking on a link in a content item, filling in user information into an online form, closing the content item using a "close window" button on the browser 104 or on the user device 102, etc.

The content provider 106, online publishers 126, user devices 102, and online system 112 are configured to communicate via the network 110 shown in FIG. 1, which may include any combination of local area and/or wide area networks, using both wired and/or wireless communication systems.

In one embodiment, the online system 112 may be a social networking system. The online system 112 may include a content store 116, a feature store 114, a user actions information store 118, a user profile store 119, one or more machine learning models 122, and a bus 120. The content store 116, feature store 114, user actions information store 118, user profile store 119, and the machine learning model(s) 122 are configured to communicate via the bus 120. In other embodiments, the online system 112 may include additional, fewer, or different components for various applications.

The user actions information store 118 stores information describing deliveries of content items to user devices 102 and user actions associated with the delivered content items. Each delivery is performed by one of the plurality of online publishers ($P_1, P_2, \ldots, P_N$) to one of the users of the online system 112. The user actions information store 118 may be organized as a database, table, file, etc., stored on one or more of removable or non-removable memory cards and computer hard drives. The user actions information store 118 is described in detail below with reference to FIG. 2.

The user profile store 119 stores attributes for users of the online system 112 (e.g., demographic information, biographic information, declarative information and other types of descriptive information, such as work experience, educational history, gender, hobbies or preferences, location, etc.) that was explicitly shared by the users and/or inferred by the online system 112. The user profile store 119 may be organized as a database, table, file, etc., stored on one or more of removable or non-removable memory cards and computer hard drives. The user profile store 119 is described in detail below with reference to FIG. 2.

The online system 112 may include a content store 116 for storing content items received from the content provider 106 to be transmitted to the online publishers 126. The content store 116 may be organized as a database, table, file, etc., stored on one or more of removable or non-removable memory cards and computer hard drives.

The online system 112 extracts feature vectors from the user actions information store 118. The feature vectors are related to deliveries, by the online publishers 126, of content items associated with user actions. The features are stored in a feature store 114. The feature store 114 may be organized as a database, table, file, etc., stored on one or more of removable or non-removable memory cards and computer hard drives.

A machine learning model 122 is trained, based on the feature vectors, to generate a likelihood ($L_i$) for each online publisher ($P_i$) that a target user's action associated with a content item would have occurred without a particular online publisher's delivery of the content item to the target user. This likelihood relates to the amount of influence the delivery of the content item by the online publisher ($P_i$) likely had on the target user who performing the particular action. For example, a content item delivered to a user device 102 by a particular online publisher may make it more likely that the user performed the action than the content item's delivery to the user by a different online publisher. The online system determines an estimated increase ($EI_i$) in the likelihood that the particular user action occurred due to the delivery by the online publisher ($P_i$) of the content item to the target user based on the generated likelihood ($L_i$) that the user action would have occurred without the online publisher's delivery of the content item to the target user.

The same or an additional machine learning model 122 may be trained, based on attributes for users of the online system 112 stored in the user profile store 119 and/or based on the feature vectors, to estimate a baseline value (B) indicating a likelihood that a target user's action associated with a content item would have occurred without delivery of the content item to the target user by any online publishers ($P_1, P_2, \ldots, P_N$). For example, since a target user may have performed a user action associated with a content item regardless of whether the content item was delivered to the target user, a baseline value (B) for the user indicates a likelihood that the target user performed the action without delivery of the content item to the target user by any online publishers ($P_1, P_2, \ldots, P_N$).

The online system 112 determines a performance metric ($Perf_i$) for the online publisher, wherein ratios of performance metrics for the online publishers ($P_1, P_2, \ldots, P_N$) are scaled based at least in part on the baseline value (B) and are related based on corresponding ratios of estimated increases in likelihoods that the user action occurred due to deliveries of the content item by the online publishers. In some embodiments, the performance metric ($Perf_i$) for each online publisher ($P_i$) may be computed as a ratio of the estimated increase ($EI_t$) in the likelihood that the user action occurred due to the online publisher's delivery of the content item to a target user to a sum of the baseline value (B) and the estimated increase ($EI_t$) in the likelihood that the user action occurred due to deliveries of the content item by a set (e.g., $P_1$, $P_5$, and $P_7$) of the online publishers ($P_1, P_2, \ldots, P_N$) that delivered the content item.

The performance metrics vector 124 indicates, for each of a set of publishers, a relative increase in the likelihood that a user performed an action associated with a content item because the content item was delivered by that publisher. This relative increase for each publisher may be computed by predicting a likelihood that the action would have been performed if the publisher did not deliver the content item to the user. The difference between this likelihood and 1 is equal to or otherwise relates to the increase in the likelihood that the action was performed due to each publisher's delivery of the content item.

The online system 112 may transmit the performance metrics for the online publishers for the user action to a content provider, an online publisher, or a third party entity. The online system 112 as disclosed processes data within the stored information describing the user actions associated with the content items into a digital representation of performance metrics for the online publishers. These performance metrics are beneficially used to compute an attribution of each publisher's delivery of content items to the user's action.

Example System Architecture

Figure 2:
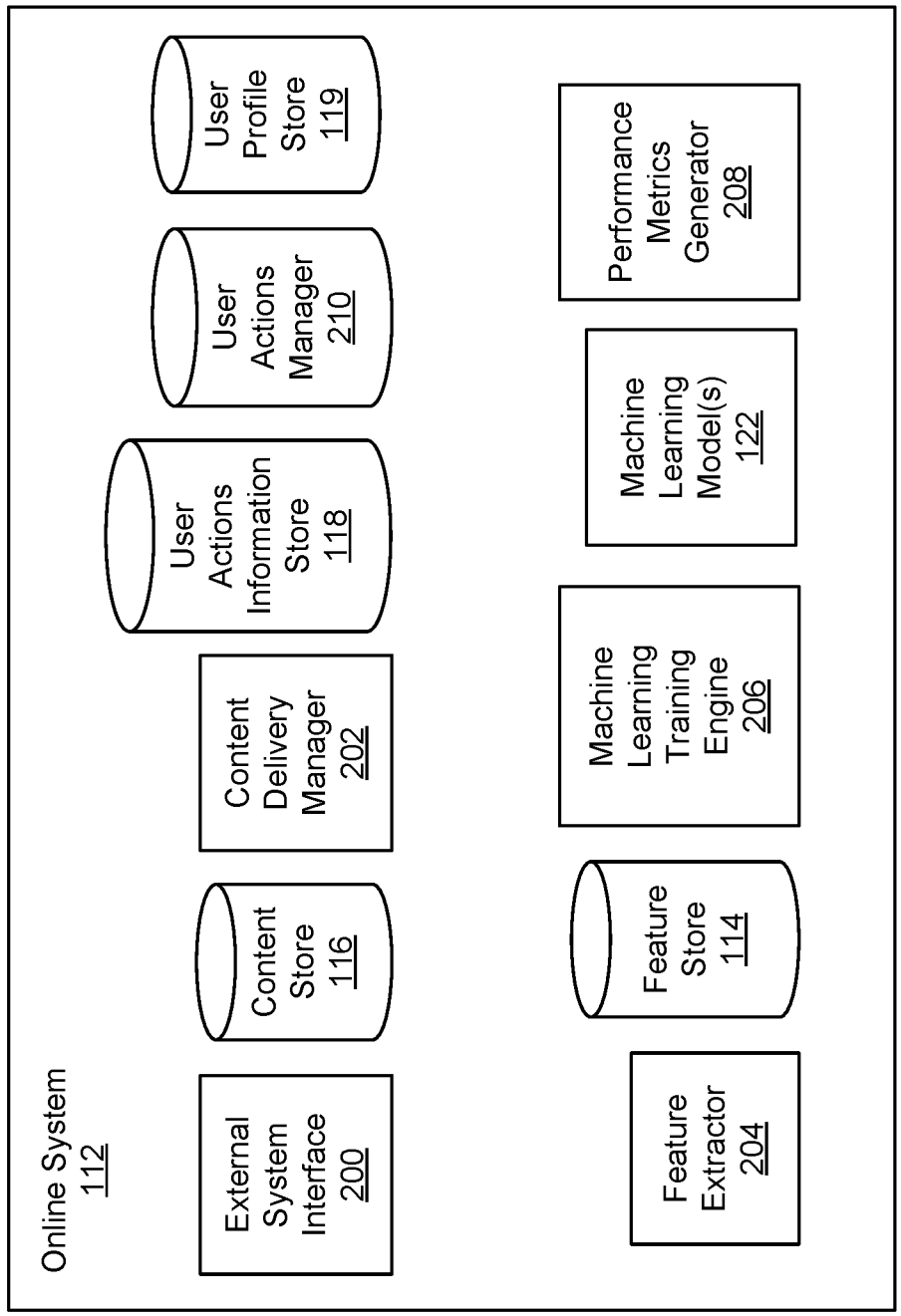
FIG. 2 is a block diagram of an example system architecture of the online system, in accordance with an embodiment.

FIG. 2 is a block diagram of an example system architecture of the online system 112, in accordance with an embodiment. The architecture of the online system 112 includes an external system interface 200, the content store 116, a content delivery manager 202, the user actions information store 118, a user actions manager 210, the user profile store 119, a feature extractor 204, the feature store 114, a machine learning training engine 206, the machine learning model(s) 122, and a performance metrics generator 208.

The external system interface 200 is a dedicated hardware networking device or software module that receives data packets representing content items from the content provider 106, data packets of information describing delivery of content items by the online publishers 126, and data packets describing user actions associated with content items by users of the online system 112. The external system interface 200 may receive at least a portion of the information describing the deliveries of content items by the online publishers 126 and user actions associated with the content items from user devices 102 responsive to rendering tracking pixels on websites of the online publishers 126. The external system interface 200 forwards data packets representing content items to the online publishers 126, and performance metrics vectors 124 to the content provider 106. In one example, the external system interface 200 forwards data packets at high speed along the optical fiber lines of the Internet backbone. In another example, the external system interface 200 exchanges routing information using the Border Gateway Protocol (BGP) and may be an edge router, a border router, or a core router.

The online system 112 may include a content store 116 for storing content items received from the content provider 106 to be transmitted to the online publishers 126. The content store 116 may be organized as a database, table, file, etc., stored on one or more of removable or non-removable memory cards and computer hard drives. The content store 116 may include multiple data fields, each describing one or more characteristics of the content items. For example, the content store 116 may contain, for a single content item, the content provider 106 of the content item, a set (e.g., $P_1$, $P_5$, and $P_7$) of the online publishers 126 who are to deliver the content item, topics of the content item, whether the content item is for a particular product, etc.

The content delivery manager 202 transmits content items, meant for client devices 102 of users of the online system 112, to online publishers 126 via the external system interface 200. The content delivery manager 202 also receives data packets describing the deliveries of content items to users of the online system 112 by online publishers 126 via the external system interface 200. The information describing the delivery of content items to user devices 102 may include the identity of a set (e.g., $P_1$, $P_5$, and $P_7$) of the online publishers 126 that delivered a particular content item. In one embodiment, the set of online publishers is represented as an ordered sequence of the online publishers 126 that delivered the content item. For example, a set may be represented as ($P_5 \rightarrow P_1 \rightarrow P_7$). In this example, the content item was first delivered to the user device 102 by online publisher $P_5$, then by online publisher $P_1$, and then by online publisher $P_7$.

The information describing the deliveries of the content items may include information indicating whether a content item was delivered within one or more of a banner of a website, an online game, or a body of a webpage. A banner of a website or a web banner is a form of advertising on the World Wide Web delivered by an ad server, such as the online system 112. It is also known as a banner ad. An online game is a video game that is either partially or primarily played through the Internet or a computer network 110. If a content item is delivered within a body of a web page, it may be placed between text paragraphs or images.

The information describing the deliveries of the content items may include information indicating whether each content item was delivered to one or more of a laptop, a desktop, a tablet, or a smartphone. The information may be encoded in a compressed form (e.g., using Huffman encoding) using digital vectors or code words. Information describing deliveries of content items and user actions associated with the delivered content items performed on user devices 102 may be stored in the user actions information store 118.

The user actions information store 118 stores information describing user actions by users of the online system 112 with content items delivered by the online publishers 126. The information may include, for each detected user action, a set of online publishers that delivered the content item associated with the user action, e.g., ($P_5 \rightarrow P_1 \rightarrow P_7$). The information may also include the type of user action associated with each content item, the number of times each online publisher (e.g., $P_1$) delivered the content item, the time of each delivery, etc.

A user action associated with a content item comprises one or more of a user of the online system registering on a web site of a content provider, the user attending an online event corresponding to the content item, the user sharing the content item with other users of the online system, the user clicking on a link in the content item, and the user purchasing a product associated with the content item. In an embodiment, the user actions information store 118 may store the information describing deliveries of content items and user actions associated with the delivered content item in the format: ($P_5 \rightarrow P_1 \rightarrow P_7$)$\rightarrow$(User Clicked on Link in Content Item), which means that after the set of online publishers ($P_5 \rightarrow P_1 \rightarrow P_7$) delivered a content item to the user device 102, the user clicked on a link in the content item.

The user actions information store 118 may also store information describing delivery of content items by sets of online publishers (e.g., $P_1$, $P_5$, and $P_7$) that did not result in user actions associated with the content item. From this information, the online system 112 may determine a likelihood or rate of user actions responsive to delivering of content items by the subset of online publishers (e.g., $P_1$, $P_5$, and $P_7$). For example, if contents items were delivered to user devices 102 by the subset ($P_1$, $P_5$, and $P_7$) of online publishers I times, and the content items received C user actions, the user actions information store 118 may store the likelihood or rate of user actions for the subset ($P_1$, $P_5$, and $P_7$) as (C/I) or (C/I×100).

The user actions information store 118 may also store affinity scores for users and online publishers or sets of online publishers. Affinity scores, or "affinities," may be computed by the online system 112 over time to approximate a user's affinity for content items delivered by an online publisher ($P_i$) based on the user actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety.

The user actions manager 210 populates the user actions information store 118 with the information describing the user actions by users of the online system 112, e.g., ($P_5 \rightarrow P_1 \rightarrow P_7$)→(User clicked on link in content item). The user actions manager 210 may also determine and populate the user actions information store 118 with information describing the likelihood or rate of user actions, responsive to delivering a content item by a set of online publishers (e.g., $P_5 \rightarrow P_1 \rightarrow P_7$)→(50%). In embodiments, this could mean that 50% of content items received user actions when delivered by the set of online publishers ($P_5 \rightarrow P_1 \rightarrow P_7$) or 50% of users performed user actions when the set of online publishers ($P_5 \rightarrow P_1 \rightarrow P_7$) delivered content items.

The user actions manager 210 receives at least a portion of the information describing deliveries of content items and user actions associated with the delivered content items from user devices 102, responsive to rendering tracking pixels on websites of the plurality of online publishers 126. The online system 112 includes tracking pixels in the content items presented to client devices 102 such that when a content item is presented via the browser 104 of the client device 102, a particular program or code (or set of instructions) is executed by the browser 104. This code associated with a tracking pixel causes a browser identifier associated with the user to be sent to the user actions manager 210. A tracking pixel may be a transparent 1×1 image, an iframe, or other suitable user interface object.

After a user has clicked on a content item, the user may purchase a product related to the content item on a third-party website of an online publisher ($P_i$) or a mobile application, or otherwise interact with a third-party website of an online publisher ($P_i$) related to the content item. When the user's client device 102 receives a page from the third-party website ($P_i$), a tracking pixel may fire, causing the browser 104 to transmit information to the online system 112 about the user actions performed by the user on the third-party website ($P_i$).

Each user of the online system 112 is associated with a user profile, which is stored in the user profile store 119. A user profile includes declarative information about the user that was explicitly shared by the user and also may include profile information inferred by the online system 112. In one embodiment, a user profile includes multiple data fields, each describing one or more user attributes for the corresponding online system user. Examples of information stored in a user profile include biographic, demographic, and other types of descriptive information, such as work experience, educational history, gender, hobbies or preferences, locations and the like. A user profile also may store other information provided by the user, for example, images or videos. In certain embodiments, images of users may be tagged with information identifying the online system users displayed in an image. A user profile in the user profile store 119 also may maintain references to actions by the corresponding user performed on content items in the content store 116 and stored in the user actions information store 118.

While user profiles in the user profile store 119 are frequently associated with individuals, allowing individuals to interact with each other via the online system 112, user profiles also may be stored for entities such as businesses or organizations. This allows an entity to establish a presence in the online system 112 for connecting and exchanging content with other online system users. The entity may post information about itself, about its products or provide other information to users of the online system 112 using a brand page associated with the entity's user profile. Other users of the online system 112 may connect to the brand page to receive information posted to the brand page or to receive information from the brand page. A user profile associated with the brand page may include information about the entity itself, providing users with background or informational data about the entity.

The feature extractor 204 is used to create features by extracting a feature vector from the retrieved information describing a set (e.g., $P_1$, $P_5$, and $P_7$) of the online publishers 126 that delivered a content item associated with a user action. For example, when the user actions manager 210 detects a user action associated with a content item, it may retrieve the identity of the set of online publishers (e.g., $P_1$, $P_5$, and $P_7$) that delivered the content item prior to the user action. The feature extractor 204 provides the feature vector to a machine learning model 122 that generates a likelihood (e.g., $L_1$) for each online publisher (e.g., $P_1$) in the set that the user action would have occurred without the delivery of the content item by the online publisher ($P_1$). The feature extractor 204 may extract a feature vector from the delivery and action information including the type of user action that occurred, whether the content item was delivered within a banner of a web site, an online game, or a body of a webpage, and whether the content item was delivered to a laptop, a desktop, a tablet, or a smartphone.

In some embodiments, the feature extractor 204 may extract attributes for one or more online system users from the user profile store 119. The feature extractor 204 provides the attributes and/or one or more feature vectors to a machine learning model 122 that estimates a baseline value (B) indicating a likelihood that a user action associated with a content item would have occurred without delivery of the content item to a target user by any online publisher ($P_1$, $P_2$, . . . , $P_N$). Examples of attributes that may be extracted by the feature extractor 204 include ages, genders, and interests of online system users.

The feature store 114 is used to store features extracted from the stored information describing the user actions associated with the content items and/or attributes for users by the feature extractor 204. The feature store 114 may be organized as a database, table, file, etc., stored on one or more of removable or non-removable memory cards and computer hard drives.

The machine learning training engine 206 trains the machine learning model(s) 122 using training sets obtained from the content store 116, the user actions information store 118, the user profile store 119, and feature store 114. Each training set includes a feature vector for a user action associated with a content item and a label that indicates whether the user performed the user action associated with the content item. The features describe the deliveries of the content item that resulted in the user action, e.g., the set of online publishers (e.g., $P_5 \rightarrow P_1 \rightarrow P_7$) that delivered the content item, the manner in which the content item was delivered, the types of user action, etc. The features also may include attributes for users of the online system 112 (e.g., demographic information, hobbies or interests of the users, etc.). The process executed by the machine learning training engine 206 is illustrated and described below with reference to FIG. 4.

Each machine learning model 122 is an analytical predictive model built from sample inputs that produces reliable, repeatable decisions and results and may uncover hidden insights through learning from historical relationships and trends in the stored information describing attributes for online system users, the delivery of the content items and/or feature vectors extracted from the content items. For a target user, a machine learning model 122 estimates a baseline value (B) indicating a likelihood that a user action associated with a content item would have occurred without delivery of the content item to a target user by any online publisher ($P_1, P_2, \ldots, P_N$) based at least in part on attributes for the target user. For example, based at least in part on a set of attributes for a target user, a machine learning model 122 may estimate a baseline value (B) of 0.3 indicating a 30% likelihood that the target user would have performed a user action without delivery of a content item associated with the user action to the target user by any online publishers ($P_1, P_2, \ldots, P_N$).

The baseline value (B) may be calibrated in various ways. In some embodiments, the online system 112 may receive information describing delivery of a content item associated with a user action by different sets of online publishers (e.g., a set of zero online publishers, a set of three online publishers including $P_1$, $P_7$, and $P_2$, etc.) and calibrate the baseline value (B) based on this information. In various embodiments, the baseline value (B) also or alternatively may be calibrated by identifying each occurrence of a user action associated with a content item within a given time period (e.g., one day, seven days, etc.) and calibrating the baseline value (B) based at least in part on a number of occurrences of the user action identified within the given time period. For example, if a user action corresponds to a conversion associated with a content item, the online system 112 may identify each conversion that occurs within a day and calibrate the baseline value (B) such that a sum of the baseline value (B) and shares of conversions attributable to each online publisher ($P_i$) is equal to the number of identified conversions. In the above example, the baseline value (B) may be calibrated for each online publisher ($P_i$).

For a user action, the same or a different machine learning model 122 also generates from the extracted feature vector, for each online publisher (e.g., $P_5$) of the set (e.g., $P_5 \rightarrow P_7 \rightarrow P_2$) of online publishers ($P_1, P_2, \ldots, P_7$), a likelihood ($L_5$) for the online publisher ($P_5$) that the user action would have occurred without the delivery of the content item by the online publisher ($P_5$)—that is, if the deliveries were performed by the set ($P_7 \rightarrow P_2$). The machine learning model may further determine an estimated increase $EI_5$ in the likelihood that the user action occurred due to the online publisher's delivery ($P_5$) of the content item to the target user based on the generated likelihood ($L_5$) that the user action would have occurred without the online publisher's delivery of the content item to the target user. For example, if ($L_5$)=75%, then ($EI_5$) may be determined as (100%-75%), or 25%.

Continuing with the above example, assume that the deliveries for a content item associated with a user action were performed by the set of publishers ($P_5 \rightarrow P_7 \rightarrow P_2$). The machine learning model may determine the likelihood values of each publisher in the set as: $L_5$=75%; $L_7$=25%; and $L_2$=25%. Then the estimated increase values may be determined as $EI_5$=(100%-75%); $EI_7$=(100%-25%); and $EI_2$=(100%-25%) or $EI_5$=25%; $EI_7$=75%; and $EI_2$=75%.

The performance metrics generator 208 determines a performance metric ($Perf_i$) for each online publisher ($P_i$), wherein ratios of performance metrics for the set of publishers ($P_5 \rightarrow P_7 \rightarrow P_2$) are scaled based at least in part on the baseline value (B) and are related based on corresponding ratios of estimated increases $EI_i$ in likelihoods that the user action occurred due to deliveries of the content item by the set of the plurality of online publishers. Continuing with the above example, the unscaled performance metric ($Perf_i$) for each online publisher ($P_i$) in the set may be determined as ($EI_5$:$EI_7$:$EI_2$) or ($1/EI_5$:$1/EI_7$:$1/EI_2$). Therefore, performance metrics generator 208 would determine the performance metrics vector 124 in this example as (1:3:3) or (1/3:1:1).

The performance metrics generator 208 may further scale and normalize the performance metrics across the set ($P_5$, $P_7$, and $P_2$) of online publishers as follows. The normalized performance metric for online publisher ($P_5$) may be generated as (($Perf_5$/($Perf_5$+$Perf_7$+$Perf_2$))×100)= ((1/7)×100)=14%. Therefore, the unscaled credited performance for online publisher ($P_5$) for the user action is determined to be 14%. Similarly, the unscaled credited performance for online publisher ($P_7$) and online publisher ($P_2$) for the user action would each be 43%. Then, assuming a baseline value (B) of 10%, the scaled performance metric for online publisher ($P_5$) may be determined as (($Perf_5$/(B+$Perf_5$+$Perf_7$+$Perf_2$))×100)=((14/110)×100)=12.7%. Similarly, the scaled performance for online publisher ($P_7$) and online publisher ($P_2$) for the user action would each be 39.1%.

In an alternate embodiment, the performance metrics generator 208 may determine both the likelihood ($L_i$) as well as the performance metric ($Perf_i$) for each online publisher ($P_i$) in a set (e.g., $P_1$, $P_7$, and $P_2$), as illustrated and described in detail below with reference to FIGS. 3 and 5.

Example Process

Figure 3:
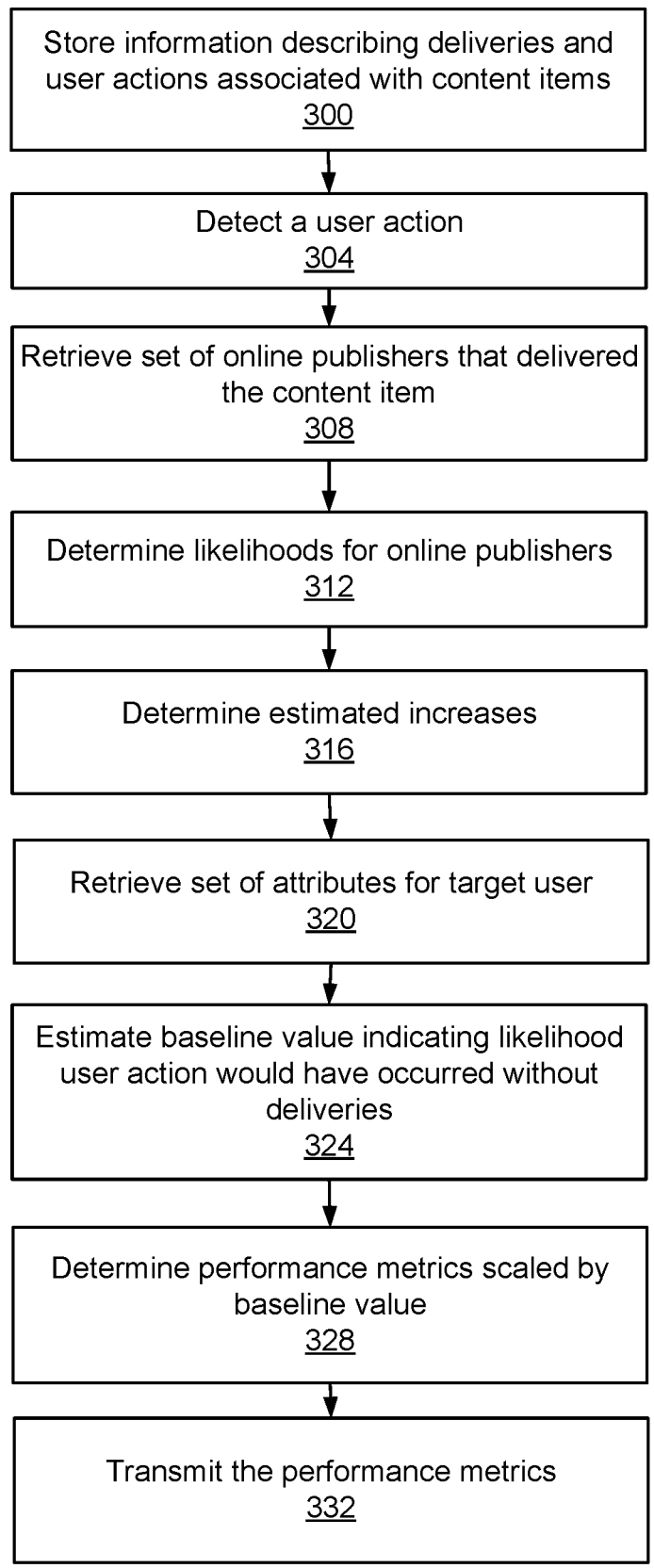
FIG. 3 illustrates an example process of determining performance metrics for online publishers, in accordance with an embodiment.

FIG. 3 is a flowchart illustrating an example process of predicting performance metrics for delivery of content items by online publishers 126, in accordance with an embodiment. In some embodiments, the process may have different and/or additional steps than those described in conjunction with FIG. 3. Steps of the process may be performed in different orders than the order described in conjunction with FIG. 3. Some steps may be executed in parallel. Alternatively, some of the steps may be executed in parallel and some steps executed sequentially. Alternatively, some steps may execute in a pipelined fashion such that execution of a step is started before the execution of a previous step.

The online system 112 stores 300 information describing deliveries of content items to user devices 102 and user actions associated with the delivered content items. Each delivery is performed by one of a plurality of online publishers 126 to one of a plurality of users of the online system 112. The online system 112 detects 304 a user action associated with a content item performed by a target user of the plurality of users. The online system 112 retrieves 308, from the stored information, information describing a set S of the plurality of online publishers 126 that delivered the content item to the target user.

For each online publisher ($P_i$) of the set S of the plurality of online publishers, the online system 112 determines 312 a likelihood ($L_i$) that the user action would have occurred without the online publisher's ($P_i$) delivery of the content item to the target user. In one embodiment, the determining of the likelihood ($L_i$) that the user action would have occurred without the online publisher's delivery of the content item to the target user comprises extracting a feature vector from the retrieved information describing the set S of the plurality of online publishers 126 that delivered the content item to the target user. The online system 112 provides the feature vector to a machine learning model 122 that generates the likelihood ($L_i$) that the user action would have occurred without the online publisher's delivery of the content item to the target user.

In one embodiment, the determining of the likelihood ($L_i$) that the user action would have occurred without the online publisher's ($P_i$) delivery of the content item to the target user comprises filtering the stored information describing the deliveries of the content items and the user actions associated with the delivered content items, by the set S of the plurality of online publishers, to obtain the likelihood ($L_i$) that the user action would have occurred without the online publisher's delivery of the content item to the target user. For example, assume the set S comprises ($P_5$, $P_7$, and $P_2$). The stored information 118 may include 1,000,000 instances of a subset ($P_7$ and $P_2$) of the set S delivering the content item, where the subset excludes the online publisher ($P_5$). The number of instances of user actions for deliveries by the subset may be 750,000. Then the likelihood ($L_5$) that the user action would have occurred without the online publisher's delivery of the content item to the target user would be $L_5$=75%.

The online system 112 determines 316 an estimated increase ($EI_i$) in the likelihood that the user action occurred due to the online publisher's delivery of the content item to the target user based on the determined likelihood ($L_i$) that the user action would have occurred without the online publisher's delivery of the content item to the target user.

The online system 112 retrieves 320 a set of attributes for the target user and estimates 324 a baseline value (B) indicating a likelihood that the user action would have occurred without delivery of the content item to the target user by any of the online publishers. The online system 112 determines 328 a performance metric ($Perf_i$) for each online publisher ($P_i$), wherein ratios of performance metrics for the set of the plurality of online publishers are scaled based at least in part on the baseline value (B) and are related based on corresponding ratios of estimated increases ($EI_i$) in likelihoods that the user action occurred due to deliveries of the content item by the set of the plurality of online publishers.

The online system 112 may transmit 332 the performance metrics for the set of the plurality of online publishers for the user action.

Example Machine Learning Training Process

Figure 4:
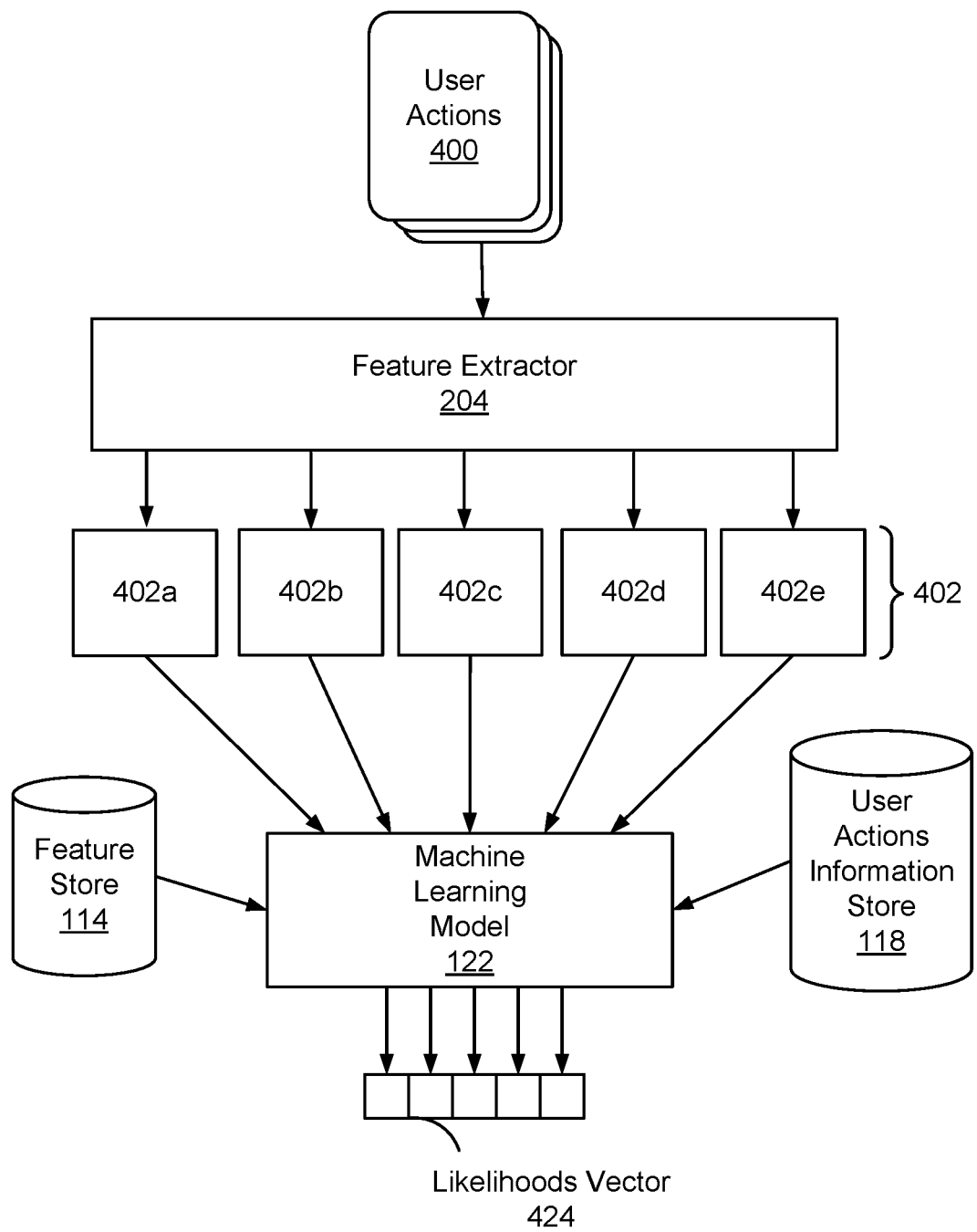
FIG. 4 illustrates an example process for training and executing a machine learning model, in accordance with an embodiment.

FIG. 4 illustrates an example process for training the machine learning model 122 by the machine learning training engine 206. In some embodiments, the process may have different and/or additional steps than those described in conjunction with FIG. 4. Steps of the process may be performed in different orders than the order described in conjunction with FIG. 4. Some steps may be executed in parallel. Alternatively, some of the steps may be executed in parallel and some steps executed sequentially. Alternatively, some steps may execute in a pipelined fashion such that execution of a step is started before the execution of a previous step.

In the training process, the feature extractor 204 extracts feature vectors 402 from the stored information 400 describing the deliveries of the content items by the online publishers ($P_1$, $P_2$, ..., $P_N$) and the user actions associated with the delivered content items. The feature extractor 204 extracts features 402, which are informative and non-redundant, facilitating training of the machine learning model 122. Redundant input data in the user actions information 400 may be transformed into a reduced set of features (feature vector 402). The extracted features 402 contain the relevant information from the user actions 400 such that the machine learning model 122 is trained by using this reduced representation instead of the complete initial data in the user actions 400.

The feature vector 402 may include a feature 402a describing a position of a delivery of the content item by an online publisher (e.g., $P_1$) in a set of deliveries (e.g., $P_1$, $P_5$, and $P_7$). The position of a certain publisher in the set may thus lead the machine learning model 122 to learn that publishers that present the content item to a user in between other publishers are most responsible for the user action.

The feature vector 402 may include a feature 402b describing whether an online publisher delivered the content item to the target user within a banner of a website, an online game, or a body of a webpage. The context of a content item may thus lead the machine learning model 122 to learn that publishers that present the content item to a user in a web banner are most responsible for the user action.

The feature vector 402 may include a feature 402c describing whether the online publisher delivered the content item to a laptop, a desktop, a tablet, or a smartphone of the target user. The type of user device 102 used may thus lead the machine learning model 122 to learn that publishers that present the content item to a user on a smartphone are most responsible for the user action.

Features 402d and 402e may represent whether a user action is a user registering on a website of a content provider 106, a user attending an online event corresponding to the content item, a user sharing the content item with other users, a user clicking on a link in the content item, or a user purchasing a product associated with the content item, etc.

The machine learning training engine 206 trains the machine learning model 122, based on the extracted feature vectors 402. The machine learning training engine 206 trains the machine learning model 122 using training sets including information from the content store 116, the user actions information store 118, and the feature store 114. After the model is trained, the user actions information store 118, and the feature store 114 may be used again in executing the model. A training set may contain a set of features and a label that represents whether the deliveries of a content item resulted in a user action.

As part of the training of the machine learning model 122, the machine learning training engine 206 forms training sets of features 402 that led to user actions, and, in some embodiments, forms negative training sets of features that did not lead to user actions. The machine learning training engine 206 applies dimensionality reduction (e.g., via linear discriminant analysis (LDA), principle component analysis (PCA), or the like) to reduce the amount of data in the feature vector 402 to a smaller, more representative set of data.

The machine learning model 122 is thereby configured to receive a feature vector 402 extracted from information describing a set (e.g., $P_1$, $P_5$, and $P_7$) of the online publishers that delivered a content item associated with a user action, and generate, based on the received feature vector 402, a likelihood ($L_i$) for each online publisher ($P_i$) in the set ($P_1$, $P_5$, and $P_7$) that the user action 400 would have occurred without a delivery of the content item by the online publisher ($P_i$). This may be implemented by configuring the machine learning model 122 to generate a score for each online publisher in a set of online publishers indicative of a likelihood of a user interacting with a content item when that online publisher is absent from the set. Such a score may be indicative of a predicted click-through rate for the online publisher. Based on the training labels used in the training sets, the output of the machine learning model 122 may also be the increase ($EI_i$) in probability that the user action occurred due to the delivery by the particular online publisher ($P_i$). The output of the machine learning model is the vector 424.

Different machine learning techniques-such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments.

In some embodiments, a validation set is formed of additional features, other than those in the training sets. The machine learning training engine 206 applies the trained machine learning model 122 to the features of the validation set to quantify the accuracy of the machine learning model 122. Common metrics applied in accuracy measurement include: Precision=TP/(TP+FP) and Recall=TP/(TP+FN), where precision is how many the machine learning model 122 correctly predicted (TP or true positives) out of the total it predicted (TP+FP or false positives), and recall is how many the machine learning model 122 correctly predicted (TP) out of the total number of features that did have the property in question (TP+FN or false negatives). The F score (F-score=2×PR/(P+R)) unifies precision and recall into a single measure. In one embodiment, the machine learning training engine 206 iteratively re-trains the machine learning model 122 until the occurrence of a stopping condition, such as the accuracy measurement indication that the model is sufficiently accurate, or a number of training rounds having taken place.

In the execution process, the online system detects a user action associated with a content item performed by a target user. From the stored information 400, information describing a set of the plurality of online publishers that delivered the content item to the target user is retrieved. For each online publisher of the set of the plurality of online publishers, a feature vector is extracted from the retrieved information describing the set of the plurality of online publishers that delivered the content item to the target user. The feature vector is provided to the trained machine learning model 122 that generates the likelihood ($L_i$) that the user action would have occurred without the online publisher's ($P_i$) delivery of the content item to the target user.

The machine learning model or performance metrics generator 208 determines the estimated increase ($EI_i$) in the likelihood that the user action occurred due to the online publisher's delivery of the content item to the target user based on the generated likelihood ($L_i$) that the user action would have occurred without the online publisher's delivery of the content item to the target user. The performance metrics generator 208 determines a performance metric ($Perf_i$) for the online publisher ($P_i$), wherein ratios of performance metrics for the set of the plurality of online publishers are scaled based at least in part on the baseline value and are related based on corresponding ratios of estimated increases in likelihoods that the user action occurred due to deliveries of the content item by the set of the plurality of online publishers 126.

Although not depicted in FIG. 4, in some embodiments, the same or a different machine learning model 122 may be trained by the machine learning training engine 206 to estimate the baseline value (B) indicating the likelihood that the user action would have occurred without delivery of the content item to the target user by any online publishers ($P_1$, $P_2$, . . . , $P_N$) in an analogous manner. In such embodiments, in addition to using training sets including information from the content store 116, the user actions information store 118, and the feature store 114, the machine learning model 122 also may be trained using user profile information from the user profile store 119. For example, the machine learning training engine 206 may form training sets of features describing user actions associated with a content item that did not result from delivery of the content item by any online publishers ($P_1$, $P_2$, . . . , $P_N$) and attributes for online system users who performed the user actions (e.g., their age, gender, geographic region, hobbies/interests, etc.) retrieved from the user profile store 119. Once trained, the machine learning model 122 is configured to receive attributes for a target user and estimate, based on the received attributes, a baseline value (B) indicating a likelihood that the user action would have occurred without a delivery of the content item by any online publishers ($P_1$, $P_2$, . . . , $P_N$).

Example Performance Metric Aggregation Process

Figure 5:
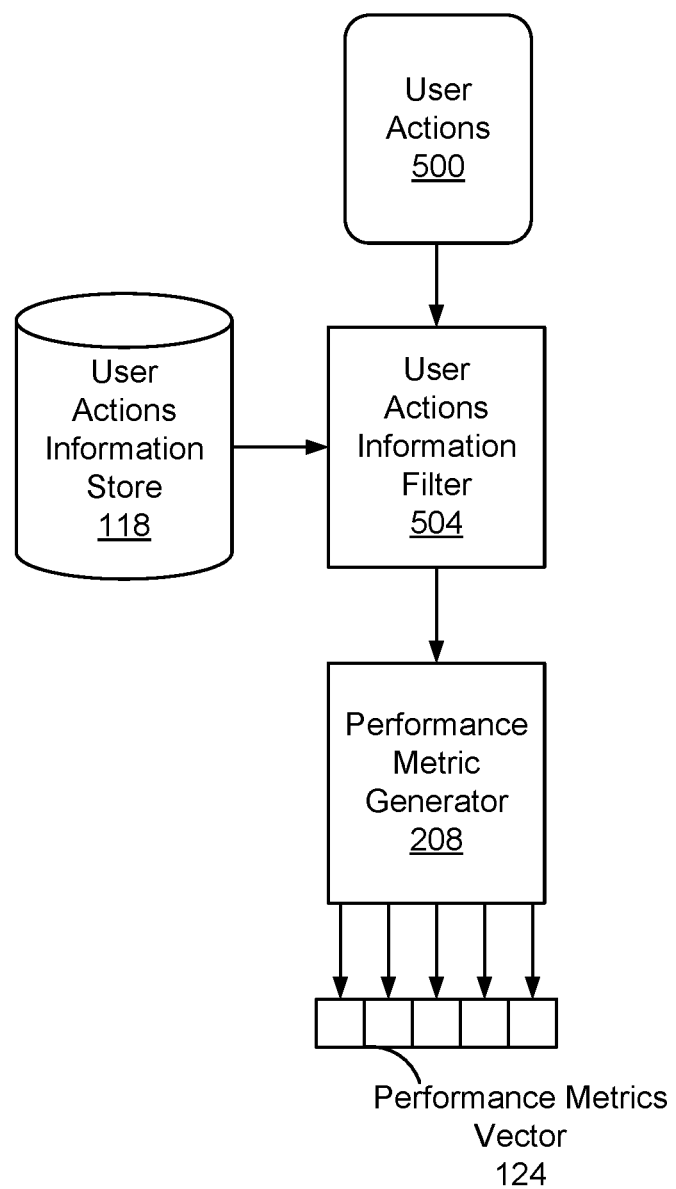
FIG. 5 illustrates an example process for generating a performance metrics vector based on filtering content delivery and user actions information, in accordance with an embodiment.

FIG. 5 illustrates an example process for generating a performance metrics vector 124 based on filtering user actions information, in accordance with an embodiment. In some embodiments, the process may have different and/or additional steps than those described in conjunction with FIG. 5. Steps of the process may be performed in different orders than the order described in conjunction with FIG. 5. Some steps may be executed in parallel. Alternatively, some of the steps may be executed in parallel and some steps executed sequentially. Alternatively, some steps may execute in a pipelined fashion such that execution of a step is started before the execution of a previous step.

To build the stored information 118 describing the deliveries of the content items and the user actions associated with the delivered content items, the online system 112 may perform a population study by delivering content items to the users of the online system by different sets of the plurality of online publishers, where each set includes and omits different publishers. The online system may then store the user actions data from these different sets. The decrease in user actions observed by omitting a certain online publisher ($P_i$) may also be stored.

A user action 500 from a target user is detected. The set S of online publishers that delivered the content item to the target user is retrieved by the User Actions Information Filter 504, e.g., ($P_1$, $P_7$, $P_2$). The likelihood that the user action would have occurred without a particular online publisher's ($P_1$) delivery of the content item to the target user is determined by filtering the stored information 118 by the set of online publishers ($P_1$, $P_7$, $P_2$). The filtering is described above with reference to FIG. 3.

The estimated increase ($EI_1$) in the likelihood that the user action occurred due to the online publisher's delivery ($P_1$) of the content item to the target user based on the generated likelihood ($L_1$) that the user action would have occurred without the online publisher's delivery of the content item to the target user is determined as described above with respect to FIG. 2. The performance metrics generator 208 determines the performance metrics vector 124 for each online publisher ($P_i$) in the set S, as described above with reference to FIG. 2.

Alternative Embodiments

The foregoing description of the embodiments have been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments is intended to be illustrative, but not limiting, of the scope of the embodiments, which is set forth in the following claims.

What is claimed is:

1. A method, comprising:
   storing, by an online system, information describing deliveries of content items and user actions associated with the delivered content items, each delivery performed by one of a plurality of online publishers to one of a plurality of users of the online system;
   detecting a user action associated with a content item performed by a target user of the plurality of users;
   retrieving, from the stored information, information describing a set of the plurality of online publishers that delivered the content item to the target user;
   retrieving a set of attributes maintained in the online system for the target user;
   extracting a set of feature vectors from the stored information describing deliveries of content items and user actions associated with the delivered content items, each feature vector identifying online publishers that delivered one or more content items associated with the user action;
   generating training sets from the feature vectors of the set, each training set including a set of features and a label representing whether delivery of one or more content items resulted in the user action;
   training a machine learning model that receives a feature vector and generates a likelihood that the user action would have been performed by a user without an online publisher's delivery of the one or more content items to the user by applying the machine learning model to the generated training sets and re-training the machine learning model by application to the generated training sets until occurrence of a stopping condition;
   for each online publisher of the set of the plurality of online publishers,
      extracting a feature vector from the retrieved information describing the set of the plurality of online publishers that delivered the content item to the target user and describing the set of attributes for the target user,
      providing the extracted feature vector to the machine learning model that generates a likelihood that the user action would have been performed by the target user without the online publisher's delivery of the content item to the target user,
      generating, by the machine learning model based on the extracted feature vector, the likelihood for the online publisher, and
      determining an estimated increase in the likelihood that the user action was performed by the target user due to the online publisher's delivery of the content item to the target user based on the generated likelihood that the user action would have been performed by the target user without the online publisher's delivery of the content item to the target user;
   estimating, using the set of attributes for the target user, a baseline value indicating an additional likelihood that the user action would have been performed by the target user without delivery of the content item to the target user by any of the set of the plurality of online publishers;

determining a normalized performance metric for each online publisher relative to the baseline value, wherein the normalized performance metrics are determined by comparing:
    the estimated increase in the likelihood that the user action was performed by the target user due to the online publisher's delivery of the content item to the target user normalized relative to the estimated increases in the likelihoods for the set of the plurality of online publishers; and
    a sum of normalized estimated increases in the likelihoods for the set of the plurality of online publishers and the baseline value;
transmitting the performance metrics for the set of the plurality of online publishers for the user action.

2. The method of claim 1, further comprising:
identifying each performance of the user action by one of the plurality of users within a given time period; and
calibrating the baseline value based at least in part on a number of the identified performances of the user action by one of the plurality of users within the given time period.

3. The method of claim 2, wherein the baseline value is calibrated such that a sum of the baseline value and a share of the number of the identified performances of the user action within the given time period that is attributable to each of the plurality of online publishers is equal to the number of the identified performances of the user action.

4. The method of claim 2, wherein the baseline value is calibrated for each of the plurality of online publishers.

5. The method of claim 1, further comprising:
delivering the content item to the plurality of users of the online system by different sets of the plurality of online publishers;
receiving information describing the user action performed in response to delivering the content item to the plurality of users by the different sets of the plurality of the online publishers; and
calibrating the baseline value based at least in part on the received information describing the user action performed in response to delivering the content item to the plurality of users by the different sets of the plurality of the online publishers.

6. The method of claim 1, further comprising:
providing the set of attributes for the target user to an additional machine learning model that generates the additional likelihood that the user action would have occurred without delivery of the content item to the target user by any online publisher of the set of the plurality of online publishers; and
generating, by the additional machine learning model based on the set of attributes, the additional likelihood that the user action would have been performed by the target user without delivery of the content item to the target user by any online publisher of the set of the plurality of online publishers.

7. The method of claim 6, further comprising:
training the additional machine learning model based at least in part on one or more of: the set of attributes for the target user, the information describing deliveries of the content items, and user actions associated with the delivered content items.

8. The method of claim 7, wherein the information describing deliveries of the content items comprises information identifying each of the plurality of online publishers that delivered the content items.

9. The method of claim 7, wherein the information describing the user actions associated with the delivered content items comprises one or more attributes for the plurality of users of the online system to whom the content items were delivered and one or more characteristics of the content items.

10. A computer program product comprising a non-transitory computer readable storage medium having instructions encoded thereon that, when executed by a processor, cause the processor to:
store, by an online system, information describing deliveries of content items and user actions associated with the delivered content items, each delivery performed by one of a plurality of online publishers to one of a plurality of users of the online system;
detect a user action associated with a content item performed by a target user of the plurality of users;
retrieve, from the stored information, information describing a set of the plurality of online publishers that delivered the content item to the target user;
retrieve a set of attributes maintained in the online system for the target user;
extract a set of feature vectors from the stored information describing deliveries of content items and user actions associated with the delivered content items, each feature vector identifying online publishers that delivered one or more content items associated with the user action;
generate training sets from the feature vectors of the set, each training set including a set of features and a label representing whether delivery of one or more content items resulted in the user action;
train a machine learning model that receives a feature vector and generates a likelihood that the user action would have been performed by a user without an online publisher's delivery of the one or more content items to the user by applying the machine learning model to the generated training sets and re-training the machine learning model by application to the generated training sets until occurrence of a stopping condition;
for each online publisher of the set of the plurality of online publishers,
    extract a feature vector from the retrieved information describing the set of the plurality of online publishers that delivered the content item to the target user and describing the set of attributes for the target user,
    provide the extracted feature vector to the machine learning model that generates a likelihood that the user action would have been performed by the target user without the online publisher's delivery of the content item to the target user,
    generate, by the machine learning model based on the extracted feature vector, the likelihood for the online publisher, and
    determine an estimated increase in the likelihood that the user action was performed by the target user due to the online publisher's delivery of the content item to the target user based on the generated likelihood that the user action would have been performed by the target user without the online publisher's delivery of the content item to the target user;
estimate, using the set of attributes for the target user, a baseline value indicating an additional likelihood that the user action would have been performed by the target user without delivery of the content item to the target user by any of the set of the plurality of online publishers;

determine a normalized performance metric for each online publisher relative to the baseline value, wherein the normalized performance metrics are determined by comparing:
- the estimated increase in the likelihood that the user action was performed by the target user due to the online publisher's delivery of the content item to the target user normalized relative to the estimated increases in the likelihoods for the set of the plurality of online publishers; and
- a sum of normalized estimated increases in the likelihoods for the set of the plurality of online publishers and the baseline value;

transmit the performance metrics for the set of the plurality of online publishers for the user action.

11. The computer program product of claim 10, wherein the non-transitory computer readable storage medium further has instructions encoded thereon that, when executed by the processor, cause the processor to:
- identify each performance of the user action by one of the plurality of users within a given time period; and
- calibrate the baseline value based at least in part on a number of identified performances of the user action by one of the plurality of users within the given time period.

12. The computer program product of claim 11, wherein the baseline value is calibrated such that a sum of the baseline value and a share of the number of identified performances of the user action within the given time period that is attributable to each of the plurality of online publishers is equal to the number of identified performances of the user action.

13. The computer program product of claim 11, wherein the baseline value is calibrated for each of the plurality of online publishers.

14. The computer program product of claim 10, wherein the non-transitory computer readable storage medium further has instructions encoded thereon that, when executed by the processor, cause the processor to:
- deliver the content item to the plurality of users of the online system by different sets of the plurality of online publishers;
- receive information describing the user action performed in response to delivering the content item to the plurality of users by the different sets of the plurality of the online publishers; and
- calibrate the baseline value based at least in part on the received information describing the user action performed in response to delivering the content item to the plurality of users by the different sets of the plurality of the online publishers.

15. The computer program product of claim 10, wherein the non-transitory computer readable storage medium further has instructions encoded thereon that, when executed by the processor, cause the processor to:
- provide the set of attributes for the target user to an additional machine learning model that generates the additional likelihood that the user action would have occurred without delivery of the content item to the target user by any online publisher of the set of the plurality of online publishers; and
- generate, by the additional machine learning model based on the set of attributes, the additional likelihood that the user action would have been performed by the target user without delivery of the content item to the target user by any online publisher of the set of the plurality of online publishers.

16. The computer program product of claim 15, wherein the non-transitory computer readable storage medium further has instructions encoded thereon that, when executed by the processor, cause the processor to:
- train the additional machine learning model based at least in part on one or more of: the set of attributes for the target user, the information describing deliveries of the content items, and user actions associated with the delivered content items.

17. The computer program product of claim 16, wherein the information describing deliveries of the content items comprises information identifying each of the plurality of online publishers that delivered the content items.

18. The computer program product of claim 16, wherein the information describing the user actions associated with the delivered content items comprises one or more attributes for the plurality of users of the online system to whom the content items were delivered and one or more characteristics of the content items.

* * * * *